May 31, 1932.   W. D. LA MONT   1,860,364
MULTIPLE STEAM GENERATOR WITH COMMON WATER CIRCULATION
Filed July 19, 1926   12 Sheets-Sheet 3

INVENTOR
WALTER DOUGLAS LAMONT
BY
Newell + Spencer
ATTORNEYS

May 31, 1932. W. D. LA MONT 1,860,364
MULTIPLE STEAM GENERATOR WITH COMMON WATER CIRCULATION
Filed July 19, 1926 12 Sheets-Sheet 8

INVENTOR
WALTER DOUGLAS LAMONT
BY
Newell & Spencer
ATTORNEYS

May 31, 1932. W. D. LA MONT 1,860,364
MULTIPLE STEAM GENERATOR WITH COMMON WATER CIRCULATION
Filed July 19, 1926 12 Sheets-Sheet 11

INVENTOR
WALTER DOUGLAS LAMONT
BY
Newell + Spencer
ATTORNEYS

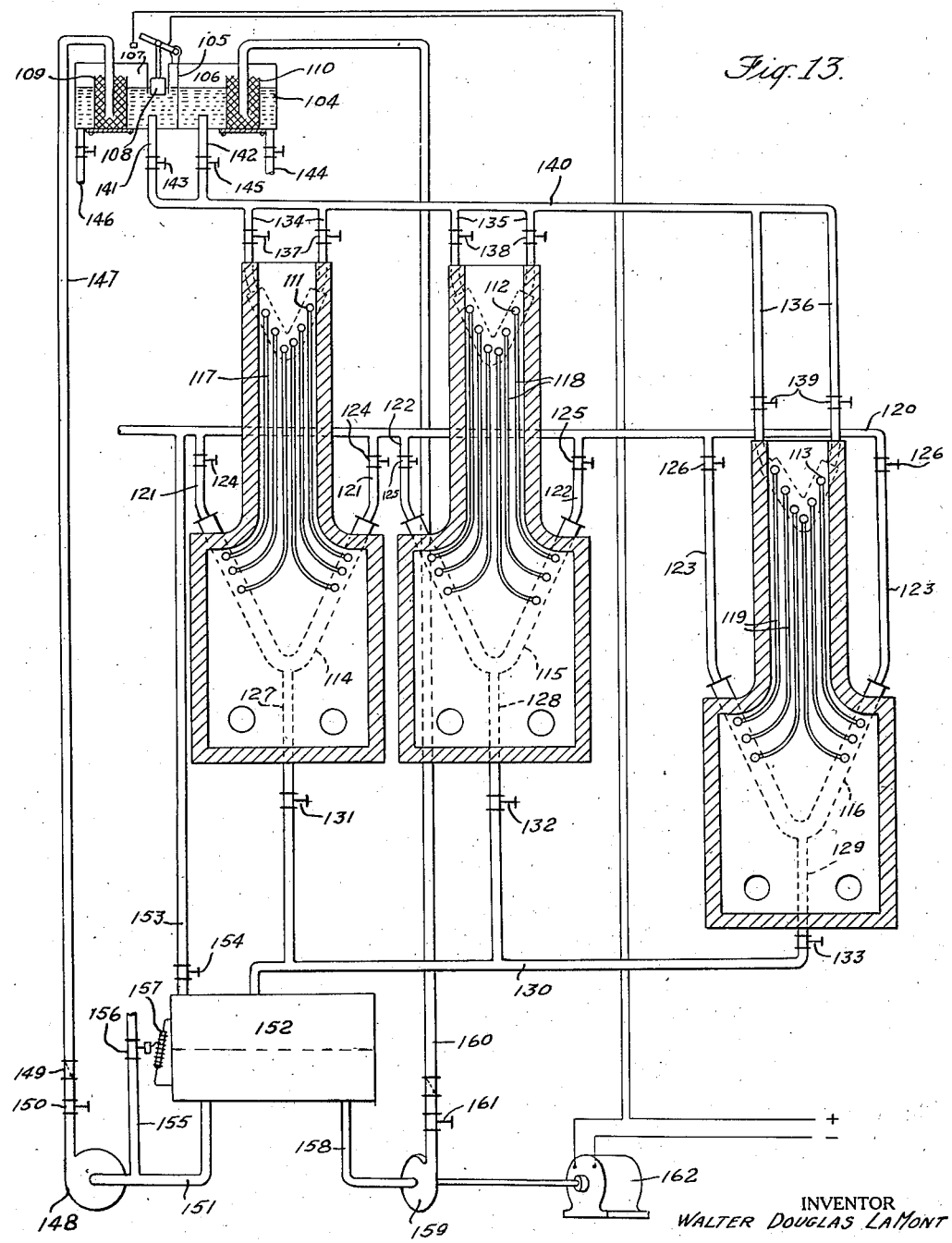

Patented May 31, 1932

1,860,364

UNITED STATES PATENT OFFICE

WALTER DOUGLAS LA MONT, OF LARCHMONT, NEW YORK, ASSIGNOR TO LA MONT CORPORATION, A CORPORATION OF NEW YORK

MULTIPLE STEAM GENERATOR WITH COMMON WATER CIRCULATION

Application filed July 19, 1926. Serial No. 123,407.

This invention relates to vapor generators and processes of generating vapor and particularly to steam generators and processes of generating steam, in which the water to be vaporized is positively circulated through a complete circuit including steam generating tubes or elements.

Steam generators having a positive circulation of water through a complete circuit in which the water is introduced into tubes so as to form films on the inner surface of the tube are described in my Patent #1,545,668 and in my copending application Serial No. 32,064 filed May 22, 1925. Steam generators in which water is positively circulated by a geyser action in the generating tubes themselves are described in my copending application Serial No. 116,305 filed June 16, 1926. Both types of generators require a substantially continuous feed, since the amount of water present in the generating tubes over and above the amount which is evaporated by passage therethrough may thereby be reduced to a minimum, this constituting one of the important advantages of these generators and being true also of positively circulated generators in which water is pumped through generating tubes without film formation. When the water circulation is effected by a pump an accurate control of feed is desirable in order to assure a continuous supply of water to the generating tubes. In a similar manner in geyser tube generators it is desirable to provide for a uniform head of water in the downtake tube.

When a plurality of positive circulation generators are operated either in conjunction with a single source of heat or by separate sources of heat I have found that it is very advantageous to provide for a common circulation in parallel through these generators. Such a circulation presents numerous advantages in that, for example, it simplifies the number of moving parts or controls in many cases, as a single pump or a single level control may be used for a plurality of generators. A further and more important advantage lies in the fact that when a number of generators are operated in parallel fluctuations in steam demand and water feed are frequently very large, particularly where positive circulation generators and especially film tube generators are used with sources of waste heat which are frequently intermittent such as, for example, waste heat from water gas generating sets and the like. When each individual generator is operated with its own set of controls a wide variation in the rate of evaporation of water in the tubes may present some difficulties in regulation. When, however, a plurality of generators are operated in parallel the peak demands of the different generators rarely coincide and a common control valve for all of the generators may require but little fluctuation to take care of widely varying demands of individual generators.

An additional advantage of the present invention lies in the fact that while it is desirable to reduce the mass of water circulated in any individual generator to a minimum, this entails a correspondingly small reserve of water, whereas when a number of generators are operated in parallel a water reserve of considerable size can be provided without increasing the amount of water circulated through the individual generators. Other and further advantages will appear from the following more detailed description of the invention taken in connection with the drawings which illustrate certain typical embodiments thereof.

In the following description the expression "positive circulation" will be applied, both to circulation by pump and other positive mechanical means, and circulation by geyser action within the generating tubes themselves. The expression "pump circulation" will be limited to circulations by positive mechanical devices. It should also be understood that while in the following description steam generators and the generation of steam will be described, the advantages of the present invention are equally applicable to the generation of any vapor from a corresponding liquid and accordingly the invention is in no sense to be considered as limited to the generation of steam, although this field presents probably the most important sphere of utility of the present invention and one for which the invention is peculiarly suited.

When a number of pump-circulated generators, operating under the same pressure, are to be arranged in accordance with the present invention, one or more pumps may be used in parallel having a common discharge in parallel into the tubes of the various generators and a common suction from the different generators or separate suctions. The generators may easily be operated under different heads, either by using a series of pumps discharging to the different generators and having a common suction return from the generators, or the difference may be brought about by a different hydraulic head, as when the generators are operated at different levels in which case, a single pump may be used for circulation. Another method consists in discharging water at a definite high pressure into a main from which it is fed into the different generators through reducing valves or other pressure transformers of various sizes, thus providing for different pressure drops. Of course, suitable means must be provided for equalizing the pressure of the water delivered to the suction of the pump from the various generators by the use of suitable reducing pressure transformers, varying hydraulic heads or the like. In the case of film tube generators in which water is introduced into the tubes through small orifices, the pressure reduction can be effected by different size orifices so that the injection orifices of the individual generators perform the dual function of injectors and reducing valves or pressure transformers.

When differences in hydraulic head are to be used to bring about operation under different pressure, the circulating pump or pumps for all the generators may discharge into a suitably elevated tank which may be at atmospheric or other desired pressure and the difference in operating pressure of the boilers may be determined purely by difference in hydraulic head. It is also possible for the pump to discharge into a closed chamber provided with suitable venting valves so that the pressure on acting to introduce the water into the generators is partly due to hydraulic head and partly due to pump pressure, and of course, a plurality of pumps may also be used.

When a plurality of geyser tube generators are operated in parallel the geyser tubes may advantageously discharge into a single steam separating tank or into separate steam drums which feed into a single tank, the return circulation for both generators, of course, coming from the same tank. The combination of a geyser tube and a pump circulation generator may also be effected, for example, by providing a suitable feed tank for the geyser tube generator into which its surplus water is discharged and feeding the film tube or solid tubes from the same tank, the excess water from the pump circulation generator being returned to the common feed tank. Other combinations are, of course, possible and are included in the invention.

It will be seen that the present invention simplifies the control of a plurality of positive circulation generators and provides for a very desirable uniformity of circulation despite large fluctuations in the circulation of individual generators. This makes possible a reduction in the number of pumps or other moving parts, water level controls and the like, and also makes it unnecessary to provide for pumps having a highly variable output, thus simplifying both their structure and control and correspondingly reducing the chance of breakdown.

The invention will be described in greater detail in connection with the accompanying drawings, in which—

Figure 13 is a view similar to Figure 3 but showing one of the generators at a lower level.

Figure 1:
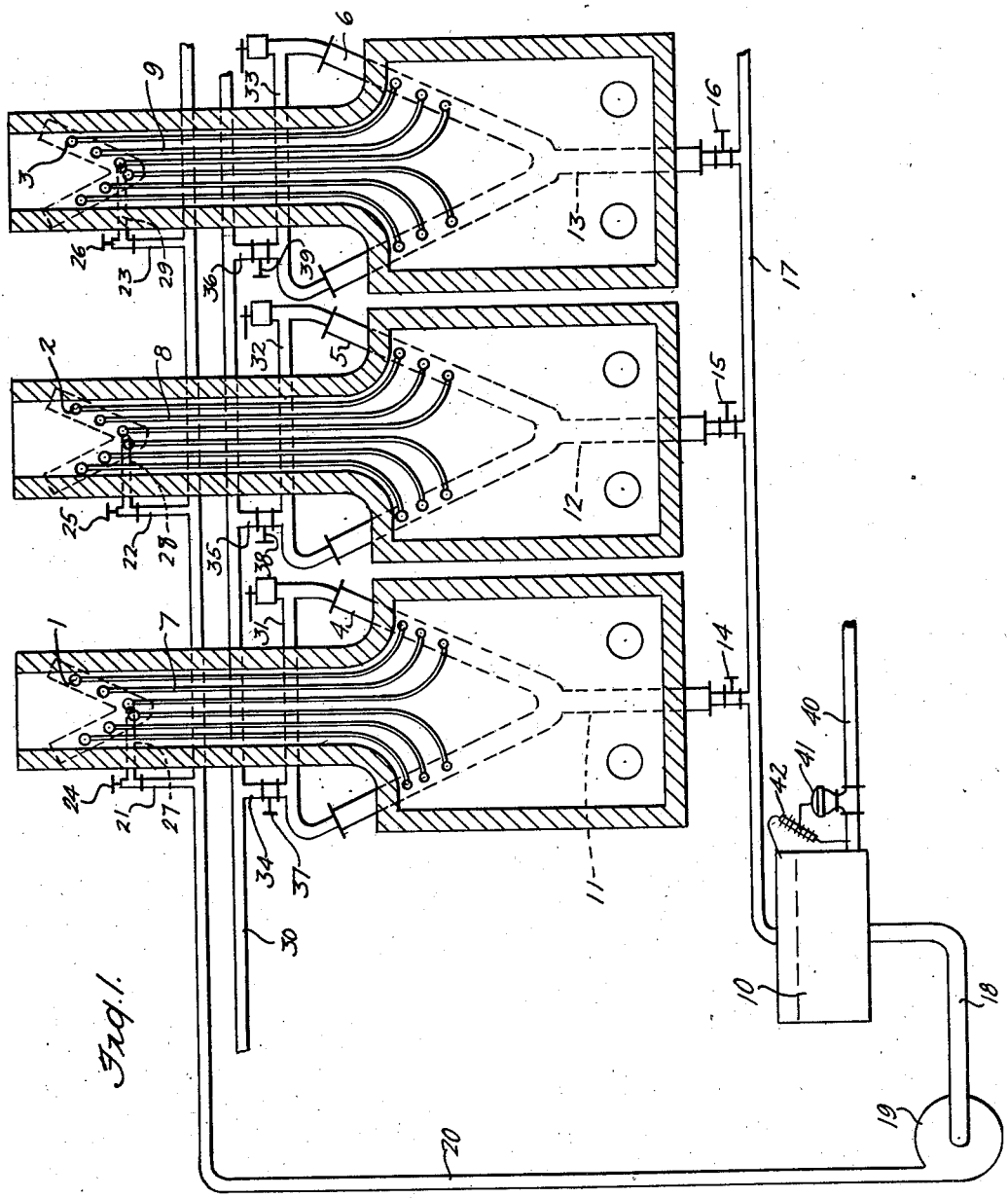
Figure 1 is a section through three film tube generators operated in multiple by a single pump.

In Figure 1, three separately fired La Mont film tube generators are shown operated in parallel. The generators consist in upper headers 1, 2 and 3, lower headers 4, 5 and 6 and tubes 7, 8 and 9 respectively. Water from the lower headers passes into a common collecting tank 10 through the pipe 17 into which pipes 11, 12 and 13 lead. These latter pipes are controlled by the valves 14, 15 and 16. Water from the tank 10 passes through the pipe 18 into the pump 19, whence it is discharged into pipe 20 and flows through the pipes 21, 22 and 23 controlled by the valves 24, 25 and 26 into the upper headers 1, 2 and 3 respectively, thus completing the water circuit for the generators.

Steam is separated in the lower headers and passes into the steam main 30 through the pipes 31 and 34, 32 and 35, 33 and 36 respectively. Valves 37, 38 and 39 control the steam flow. Feed water enters into the tank 10 through the pipe 40 provided with a valve 41 which in turn is controlled by the water level control 42 operating on the tank 10.

The tank 10 may be subjected to the pressure which obtains in the generators by leaving the valves 14, 15 and 16 substantially open. In this case, the feed water which is introduced through the pipe 40 must be supplied at a pressure higher than that in the tank. It is possible, however, to operate tank 10 at a lower pressure, for example, at a pressure slightly below that of the feed water supply. This reduction in pressure can be effected by partially closing valves 14, 15 and 16 and utilizing them as pressure transformers to reduce the pressure of the water flowing through them.

Operating tank 10 under low pressure presents numerous advantages in certain installations. In the first place, it is not necessary to construct the tank to resist high pressures and a much more economical and larger tank construction is thereby made possible. An even more important advantage lies in the fact that the pressure on the suction of the circulating pump 19 depends on the pressure in the tank 10. A low pressure on the pump suction minimizes chances for leakage through the pump stuffing box and permits the use of pumps of more economical construction. At the same time, the necessity for a feed water pump is eliminated as water can be fed directly from the water supply lines. Obviously, when a low pressure is used in tank 10, the pump 19 performs both the functions of feed pump and circulating pump.

The different generators may be operated under the same pressure as shown in Fig. 1, or a different pressure can be used by a suitable adjustment of the valves 24, 25 and 26, which act as pressure transformers and determine the pressure under which water is introduced into the generating elements of the respective generators. Of course, a suitable adjustment of the valves 14, 15 and 16 should be made so as to compensate for the different pressures which obtain in the various generators. The adjustment can be sufficient to reduce the pressure of the unevaporated water of the high pressure generators to that of the low pressure generators or the pressure of the water delivered into tank 10 from all three generators can be brought below the pressure of the lowest pressure generator or even down to the water supply pressure as described above. It will be seen, therefore, that the modification shown in Fig. 1 is very flexible and the generators are capable of operating under the same or different pressures with or without reduced pressure in the tank 10.

When all three generators are operated as film tube generators and are provided with suitable injection orifices in the upper headers 1, 2 and 3, these orifices produce a pressure drop and may be utilized to produce different pressures in the different generators. The regulation by orifice size, of course, may be combined with a pressure regulation by adjustment of the valves 24, 25 and 26 and obviously, the regulation of the individual generators may be the same or different, that is to say, for example, one generator may depend on its injection orifices alone to determine its pressure, whereas the other two generators may have their pressure determined by suitable adjustment of the valves in the intake pipes 21, 22 and 23. The system is very flexible and the best combination for any particular purpose will be determined largely by the operating conditions which obtain. It is an advantage of this modification of the applicant's invention that it can be applied to a wide number of differing operating conditions.

Figure 2:
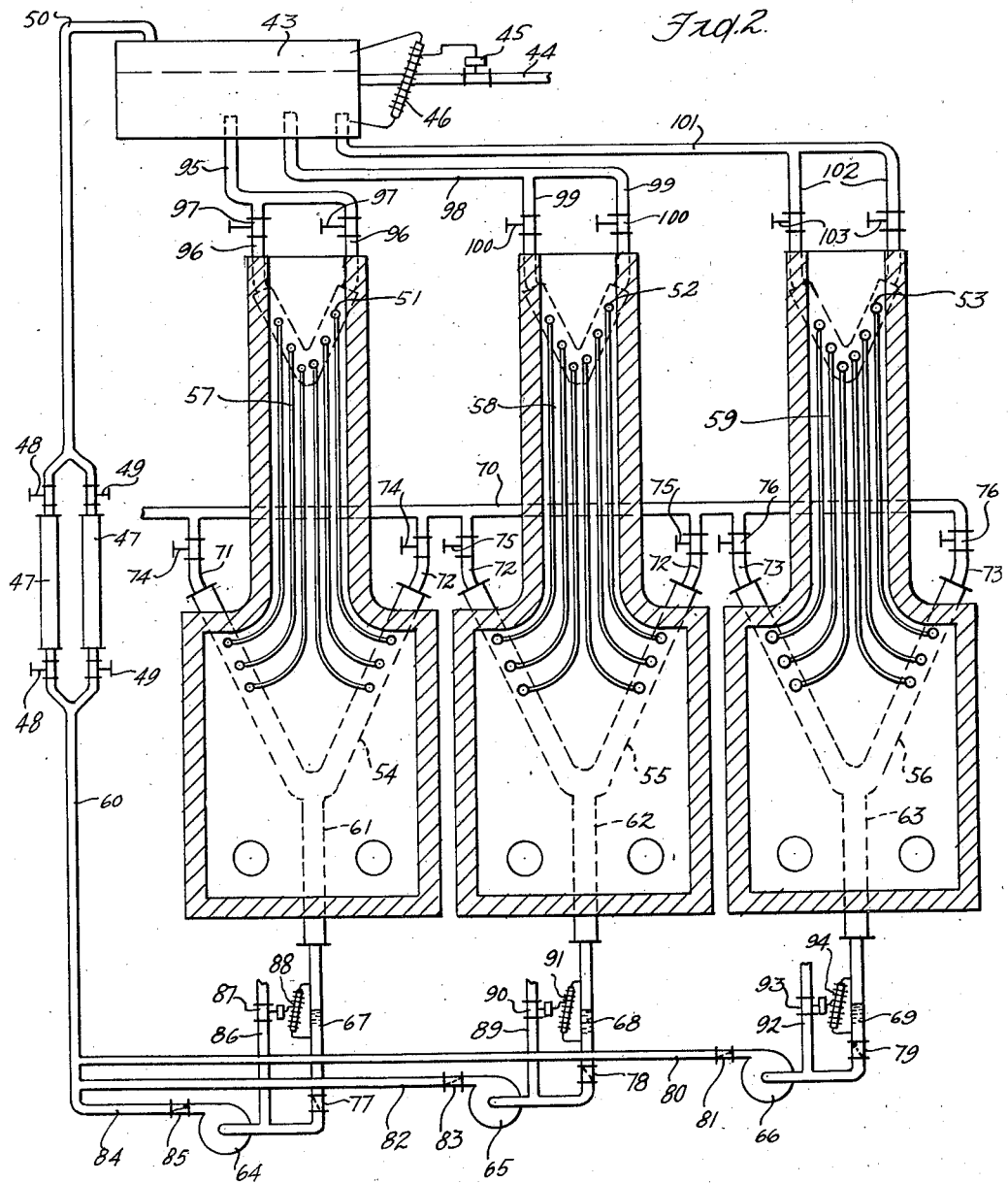
Figure 2 is a section with three film tube generators operated in parallel with a common gravity head.

In the construction illustrated in Figure 2, three film tube generators similar to those in Figure 1, are shown operated in parallel from a common tank under a gravity head. The generators consist in upper headers 51, 52 and 53, lower headers 54, 55 and 56 and tubes 57, 58 and 59 respectively. Water from the respective lower headers passes down through the pipes 61 and 67, 62 and 68 and 63 and 69, into the pumps 64, 65 and 66. A water level is established in the pipes 67, 68 and 69 and water level controls 88, 91 and 94 are associated therewith. These controls operate valves 87, 90 and 93 in pipes 86, 89 and 92 and effect a control of the feed water passing into the pumps 64, 65 and 66 respectively. Check valves 77, 78 and 79 are also provided in the pipes 67, 68 and 69 in order to minimize level fluctuations in these pipes.

Water from the pumps 64, 65 and 66 is discharged through the pipes 80, 82 and 84 provided with check valves 81, 83 and 85 into the common pipe or main 60. The water flowing through the pipe 60 is caused to pass through filters or strainers 47 arranged in parallel and controlled by the valves 48 and 49. By opening one set of valves and closing the other a single screen is used and can be cut out of circulation, and the other screen brought into circulation by reversing the valves.

After the removal of sediment in the filters 47 the purified water passes through the pipe 50 into the gravity tank 43 which is provided with a water level control 46 operating a valve 45 in an auxiliary feed water pipe 44. From the tank 43, pipes 95, 98 and 101 lead to the various generators, where they divide into double pipes 96, 99 and 102, communicating with the upper headers 51, 52 and 53 respectively. Valves 97, 100 and 103 may be used to control the inlet of water and by this means it is possible to operate the generators under different pressures.

Steam is separated from water in the lower headers 54, 55 and 56 and is conducted into a steam main 70 by the pipes 71, 72 and 73 respectively, which in turn are controlled by the valves 74, 75 and 76.

The construction shown in Figure 2 has the advantage over that shown in Figure 1, that a relatively large tank 43 provides for a substantially constant hydraulic head, irrespective of the relative amounts of water which are circulated through the generators. It is thus possible to circulate a minimum of water through the generators and at the same time have a sufficient reserve volume to take care of sudden fluctuations in heat and steam demand. When the amount of water circulated through the generating tubes is but little in excess of that evaporated the percentage of feed water introduced into the circulation becomes relatively high and as this feed water is usually cold, the temperature of the water entering the upper headers 51, 52 and 53 is quite low and very much below that of the steam being generated. Owing to the low temperature of water introduced into the upper headers it is possible to reduce the gas temperature to a very low point since the heating gases flow counter to the water in the generating tubes and with a high heat transfer capacity of the film tubes heat heads well below zero can be very readily obtained with a corresponding increase in thermal efficiency. In the present application it should be understood that the expression "heat head" is used to describe the difference in temperature between the heating gases after passing over the generating tubes and the temperature of saturated steam generated. With relatively cool water entering the upper reaches of the tubes it is thus possible to reduce the gas temperature below that of the steam temperature in the generator and to obtain a heat head which is a negative quantity. At the same time the generators are fully protected against rapid fluctuations of heating and steam demand despite the very small amount of excess water circulated, since the tank 43 contains a considerable volume of water and can readily respond to fluctuations in demand from the different generators, thus constituting one of the important advantages inherent in this modification of the present invention.

Figure 3:
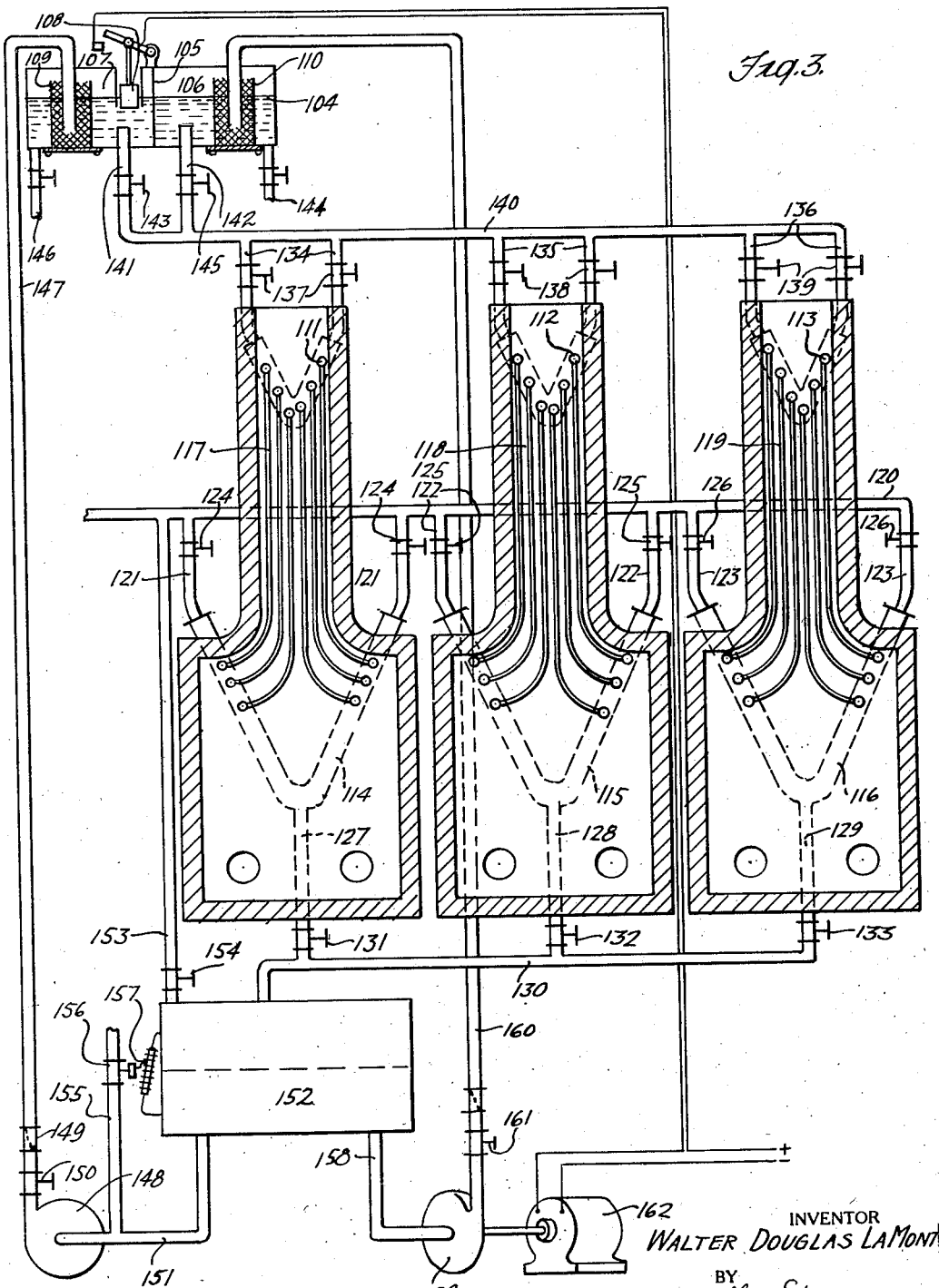
Figure 3 is a section of three La Mont generators operated in parallel and provided with auxiliary circulating means.

In Figure 3, three La Mont film tube generators are arranged somewhat similarly to the arrangement in Figure 2 but instead of providing individual circulating pumps, the water from the lower headers of the generators is collected in a common tank and is normally circulated by means of a single pump.

The three generators consist in upper headers 111, 112 and 113, lower headers 114, 115 and 116 and tubes 117, 118 and 119. Steam is separated in the lower headers and is taken off into the steam main 120 through the pipes 121, 122 and 123 which are in turn controlled by the valves 124, 125 and 126.

Excess water in the lower headers passes down through the pipes 127, 128 and 129 controlled by valves 131, 132 and 133 into the pipe 130 leading to the tank 152 where any steam still retained by the water is separated and passes off into the steam main 120 through the pipe 153 controlled by the valve 154. This same pipe serves also to return any water which is condensed in the main 120.

Normal circulation demands are taken care of by the pump 148 which draws water from the tank 152 through the pipe 151 and discharges it through the pipe 147 into an elevated gravity tank 104. A manual valve 150 and check valve 149 control the flow in the pipe 147 and feed water is introduced into the pipe 151 through pipe 155 controlled by valve 156 which is in turn actuated by the water level control 157 operating on the tank 152.

The upper gravity tank 104 is divided into two separate compartments 106 and 107 by the partition 105. The pipe 147 passes into the compartment 107 and is provided with a suitable screen 109 to remove impurities. A valve drain pipe 146 is also provided for draining this portion of the tank. A pipe 141 controlled by a valve 143 leads from the bottom of the compartment 107 into the circulating pipe 140 which in turn communicates with the upper headers 111, 112 and 113 through the pipes 134, 135 and 136 respectively. These pipes are in turn provided with control valves 137, 138 and 139.

An auxiliary pump 159 draws water from the tank 152 through the pipe 158 and discharges through the pipe 160 controlled by the valve 161 into the compartment 106 of the tank 104. A screen 110 surrounds the inlet pipe and the compartment is also provided with a suitable valved drain pipe 144. The bottom of compartment 106 is connected to the pipe 140 through the pipe 142 which is provided with the valve 145.

A float 108 in the compartment 107 actuates an electrical switch controlling the motor 162 which in turn operates the auxiliary pump 159. Thus, under ordinary operation when both valves 143 and 145 are open, the pump 148 provides the necessary circulation. If, however, the steam demands exceed the delivery capacity of pump 148 the water level in compartment 107 will fall and with it the float 108. When the level drops below a certain predetermined minimum the float 108 closes an electric switch starting up the motor 162 and the pump 159. This pump delivers water to the compartment 106 and takes care of the increased demand, the water flowing from the compartment 106 through the pipe 142 into the pipe 140.

This construction presents many advantages, particularly with generators having very variable steam demands as it is possible to construct the pump 148 of moderate size sufficient to take care of ordinary running conditions, and when momentary peak loads occur the auxiliary or reserve pump 159 comes into operation. It is thus possible to utilize a relatively small pump at a fairly high percentages of its capacity continuously which is advantageous from an operating standpoint. At the same time large variations in steam demand can be taken care of and the auxiliary pump 159 is an added safeguard and assures water circulation even should pump 148 break down. In such a case, of course, feed water from pipe 156 would flow back into the tank 152 through the pipe 151 and would assure an adequate volume of water.

Under normal operating conditions most of the water is circulated through the pipe 147 and accordingly most of the impurities are removed by the screen 109. When this screen becomes clogged the pump 148 may be shut off. The water level in compartment 147 will then drop and pump 159 will be started up. Valve 143 can then be closed and the valve in pipe 146 opened in order to drain compartment 147. After this compartment has been drained the screen can be removed, for example, through a suitable opening in the bottom of the tank and cleaned. After the screen is replaced the valve in the pipe 146 is closed, the valve 143 opened and pump 148 started up. The water level in compartment 107 will then rise until the float opens the electric switch, the circulation thereafter being controlled by the pump 148 as under the usual operating conditions.

The pump 148 may be driven by any suitable source of power, for example, a small steam turbine and in a similar manner the pump 159 may be driven from any desired source of power, the invention not being limited to the use of an electric motor, although electricity presents many advantages for an auxiliary unit. If other sources of power are used to drive the pump 159, the control means may have to be changed, although even in the case of other power sources an electric starting and stopping switch is advantageous. Thus, for example, the float 108 may operate an electric switch which in turn operates a steam valve through a relay in case the pump 159 is driven by steam. Direct mechanical operation of power valve by means of the float 108 may also be used in certain cases, but is usually less desirable as the amount of power required may render the float operation less reliable.

The modifications shown in Figures 1 to 3 illustrate separately fired film tube generators and the parallel operation which forms the subject matter of the present invention, can very advantageously be utilized in connection with such installations, permitting, as it does, large fluctuations in steam demand in the various generator units and even permitting shut-down of one or more units where this may be desirable. A single steam main has been shown as a suitable arrangement where all of the generators operate at the same pressure or where it is desired to utilize steam at an average pressure. It will be clear to those skilled in the art, however, that individual steam pipes may be taken from the separate generators and it is then possible to operate the generators under different pressures, for example, in Figure 1, by varying the pressure drop through the valves 24, 25 and 26, as described above, or in Figures 2 or 3 by varying the pressure drop through the control valves 97, 100 and 103 in the case of Figure 2 or the valves 137, 138 and 139 in the case of Figure 3. A similar variation of pressure may also be effected by a proper dimensioning of the injection orifices in the different upper headers as described in connection with Fig. 1. A combination of these two methods may also be utilized. Where generators are operated at different pressure it may also be necessary to provide for a suitable pressure transforming action in the discharge of the water from the respective lower headers. Thus, in Figures 1 and 3, valves 14, 15 and 16 or 131, 132 and 133 may be suitably adjusted to compensate for the different pressures under which their respective generators are operated. In case of Figure 2, the characteristics of the pump 64, 65 and 66 may be suitably varied if necessary, to compensate for pressure differences.

The present invention is applicable to combinations of various different types of generators operating in parallel. Two such combinations are shown, for example, in Figures 4 and 5.

Figure 4:
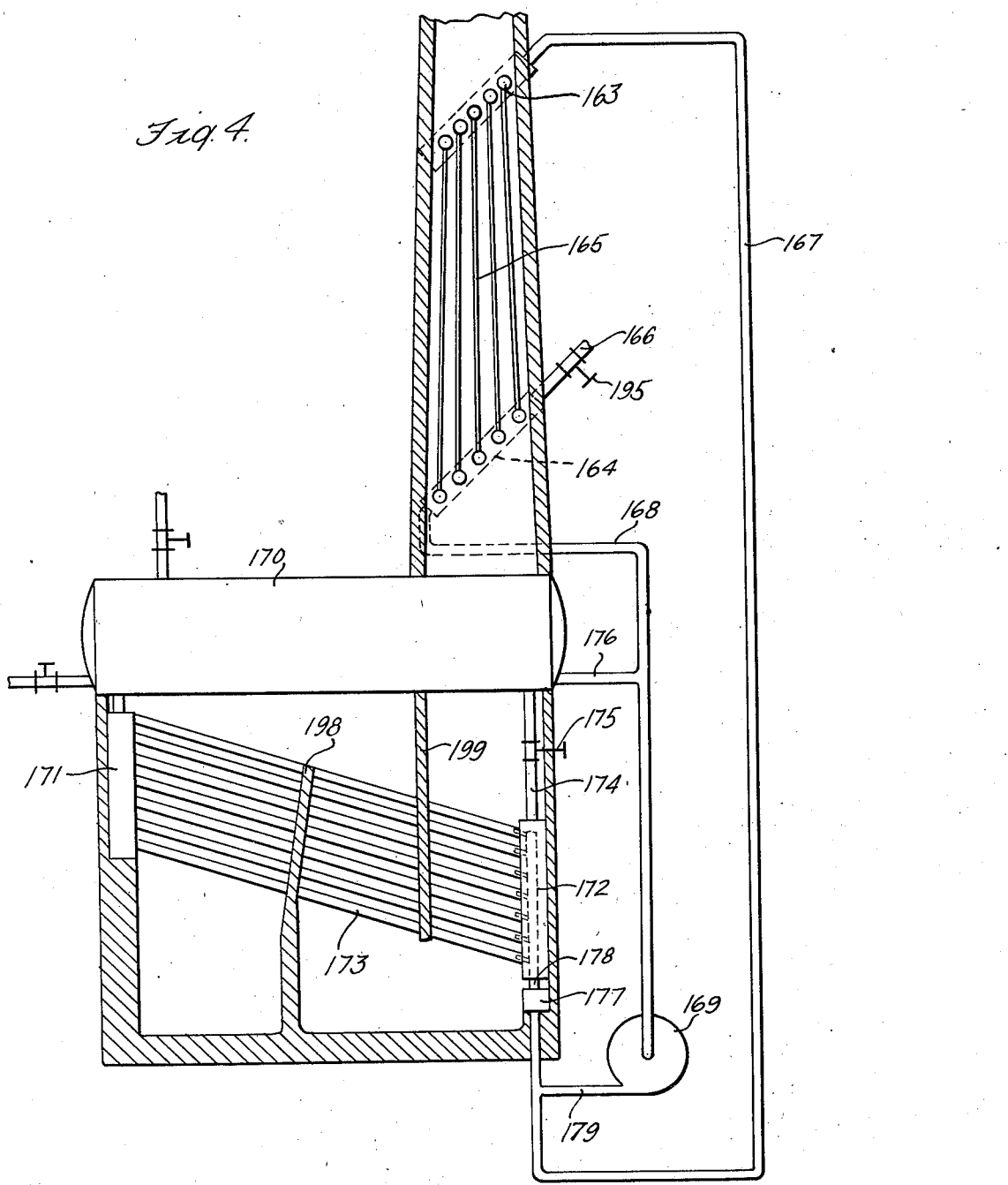
Figure 4 is a film tube generator operated in parallel with an inclined tube water tube boiler heating gases flowing in series through the two generators.

In Figure 4, a film tube generator is placed in the stack of an inclined tube water tube generator of conventional design. The film tube generator consists in upper headers 163, lower header 164 and tubes 165, steam being taken off from the lower header or pot 164 through the pipe 166 provided with a valve 195. Water circulation is effected by means of the pump 169 which takes water from the pot 164 through the pipe 168 and discharges through the pipes 179 and 167 into the upper headers 163.

The water tube boiler consists in a drum 170, front headers 171, rear headers 172, tubes 173, a mud drum 177 connected to the headers 172 by the short pipe connections 178 and pipes 174 connecting the rear headers 172 to the drum 170. These latter pipes are preferably provided with control valves 175. Baffles 198 and 199 are also arranged in the furnace chamber in the usual manner to cause heating gases to pass over the water tubes in three passes.

Parallel circulation is effected by the connecting pipe 176 from the drum 170 to the pump suction pipe 168 and by the fact that the mud drum 177 is connected to the pipe 167 which in turn is connected to the discharge pipe 179 of the pump 169. The operation of the pump causes water to circulate through the film tube generator and also to circulate through the water tube boiler, water entering through the mud drum 177 passing through the tubes 173 up through the headers 171 and then back through the drum 170 and pipe 176 into the suction of the pump. The extent to which the circulation in the water tube boiler is positively effected by the pump depends on the adjustment of the valves 175. If these valves are completely closed a complete positive circulation is effected in the water tube generator, substantially all of the water being circulated through the tubes 173 and drum 170 and being returned to the pump. As the valves 175 are opened an increasing percentage of the water from the drum 170 may pass directly down into the rear headers 172 and the circulation in the water tube boiler then becomes partly a convection circulation and partly a positive circulation. Where valves 175 are to be operated in a full open position it might be desirable to provide suitable check valves in the pipes 174 in order to prevent water entering through the pipes 178 from flowing up through the header 172 and pipes 174 into the drum 170 and thus reversing the circulation. A similar effect can be produced by extending the pipes 178 through the headers 172 and providing the pipes with nozzles extending into the tubes 173, whereby the streams of water passing through the pipes and directed into the bottom portion of the generating tubes assist the convection circulation by injection action. It is this latter construction which we have shown in Figure 4. Instead of using partly open valves to effect a restriction of water flow, restricted tubes may be used to effect the same purpose. The restricted tubes may be considered as valves having a fixed setting.

An exceedingly efficient utilization of both generators is effected since the steaming capacity of the water tube generator is very materially increased by the positive parallel circulation even when this circulation forms only a portion of the total circulation in the water tube boiler. Of course, when the valves 175 are closed and a full positive circulation is produced the efficiency of the water tube generator is increased to a still greater extent. The pump 169 must, however, be of larger capacity in such cases owing to the very large volume of water which must be circulated through the water tube generator to produce the desired velocity through the large generating tubes.

The film tube generator is assured a constant supply of water since the pump suction is in communication with a large mass of water in the drum 170 of the water tube generator. A further important advantage of the large mass of water available in the drum 170 can be enjoyed by connecting the steam space of this drum to the steam pipe 166, whereby sudden steam demands can be taken care of by the large heat storage in the water in the drum 170 and there is less tendency to produce fluctuations in steam pressure in the film tube generator. The water in the drum 170 may be considered as a kind of accumulator which serves to equalize sudden fluctuations in steam demand. At the same time the La Mont film tube generator in the stack serves to reduce the temperature of the heating gases to a very low point, owing to the extreme efficiency of the film tube generating elements. It is thus possible to operate the water tube generator at a very high rating which might be very wasteful under ordinary circumstances because of excessive stack temperatures. These stack temperatures are in all cases reduced by the La Mont film tube generator and a very high steaming capacity in both units is thus readily possible.

Feed water may be introduced at any point in the parallel circulation and is indicated on the drawings as entering the front end of the drum 170. It may be desirable in some cases to introduce feed water into the pipe 167 in order to cool down the water passing into the upper headers 163 of the film tube generator and thus make possible a very great reduction in stack gas temperature. Feed may also be introduced both into the drum of the water tube generator and into the pipe 167 where such a double feed may be desired.

Figure 5:
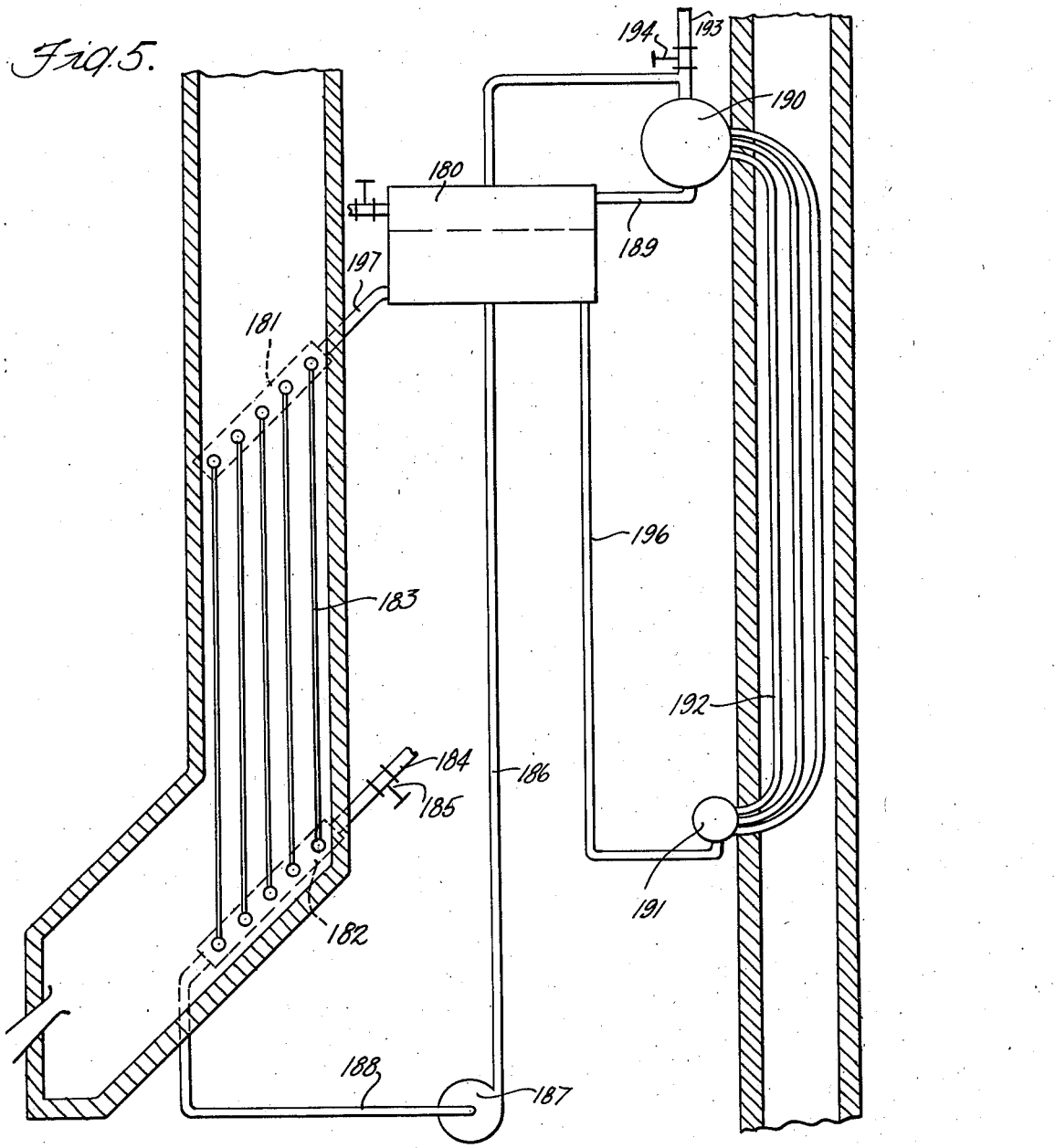
Figure 5 shows a combination of a film tube generator and a geyser tube generator operated in parallel.

Fig. 5 illustrates a combination of a La Mont film tube generator associated with a separately fired geyser tube generator. A common water tank 180 feeds both generators. The La Mont generator consists in upper headers 181 and in a lower header or pot 182 and tubes 183, while the geyser tube generator consists in an upper steam drum 190, lower drum 191 and geyser tubes 192. Water circulation from the tank 180 to the La Mont generator is through the pipe 197 and the unevaporated water separated in the lower header or pot 182 passes through the pipe 188 into the pump 187 where it is forced through the pipe 186 back into the tank 180, thus completing the circulation. The pipe 196 connects the tank 180 to the lower header 191 of the geyser tube generator, while pipe 189 similarly connects the water space of the drum 190 to the tank 180. Circulation in the geyser tube generator is, therefore, from the drum 191 up through the tubes 192 into the drum 190 where steam is separated and passes off through the pipe 193 controlled by the valve 194, water flowing from the drum 190 through the pipe 189 into the tank 180, whence water flows to the drum 191 through the pipe 196, completing the circuit. Steam from the film tube generator is separated in the lower header 182 and passes off through the pipe 184 controlled by the valve 185.

The parallel circulation of the two generators permits a very effective installation which is capable of taking care of wide fluctuations in the steam demand of the different generators. The relatively large volume of water in the tank 180 serves as a sufficient reserve so that both the film tube and geyser tube generators can be run with a minimum of circulating water without the danger of running the tubes dry under varying loads. Feed may be introduced into the tank 180 as shown or in any other suitable point in the circulation of either generator. Owing to the fact that a small amount of water can safely be circulated in the two generators, the temperature of the water in tank 180 can be kept relatively low as the proportion of feed water introduced to water in the circulations is considerably higher than in installations where large amounts of circulating water are necessary. The low temperature of the water in the tank 180 permits a very low heat head in the La Mont generator and heat heads considerably below zero can be easily obtained. The same low temperature of the water in tank 180 is important in effecting a rapid and vigorous circulation in the geyser tube generator, since the difference in weight between the water column in the pipe 196 and in the geyser tubes 192 is dependent to a considerable extent on the density of the water in the pipe 196. The cooler the water, of course, the greater the density, and, accordingly, the greater the pressure differential which makes for a rapid circulation through the geyser tube generator.

The arrangement shown in Fig. 5 is very flexible and can be applied to a large number of generators without any extensive structural changes. A constant gravity head and an adequate water reserve is provided at all times for the generators and operation of the individual generators is not adversely affected by variations in the operation of their associated generators. Thus, wide fluctuations may take place in the amount of water evaporated in one generator, without affecting in any material degree the circulation in the other and it is perfectly practicable to shut down one of the generators without affecting the running of the other. This is of advantage in installations where intermittent peak loads have to be handled and where it is desirable at times to shut down one or more generating units. All the advantages of parallel flow are retained without affecting the efficiency of either type of generator.

Figure 6:
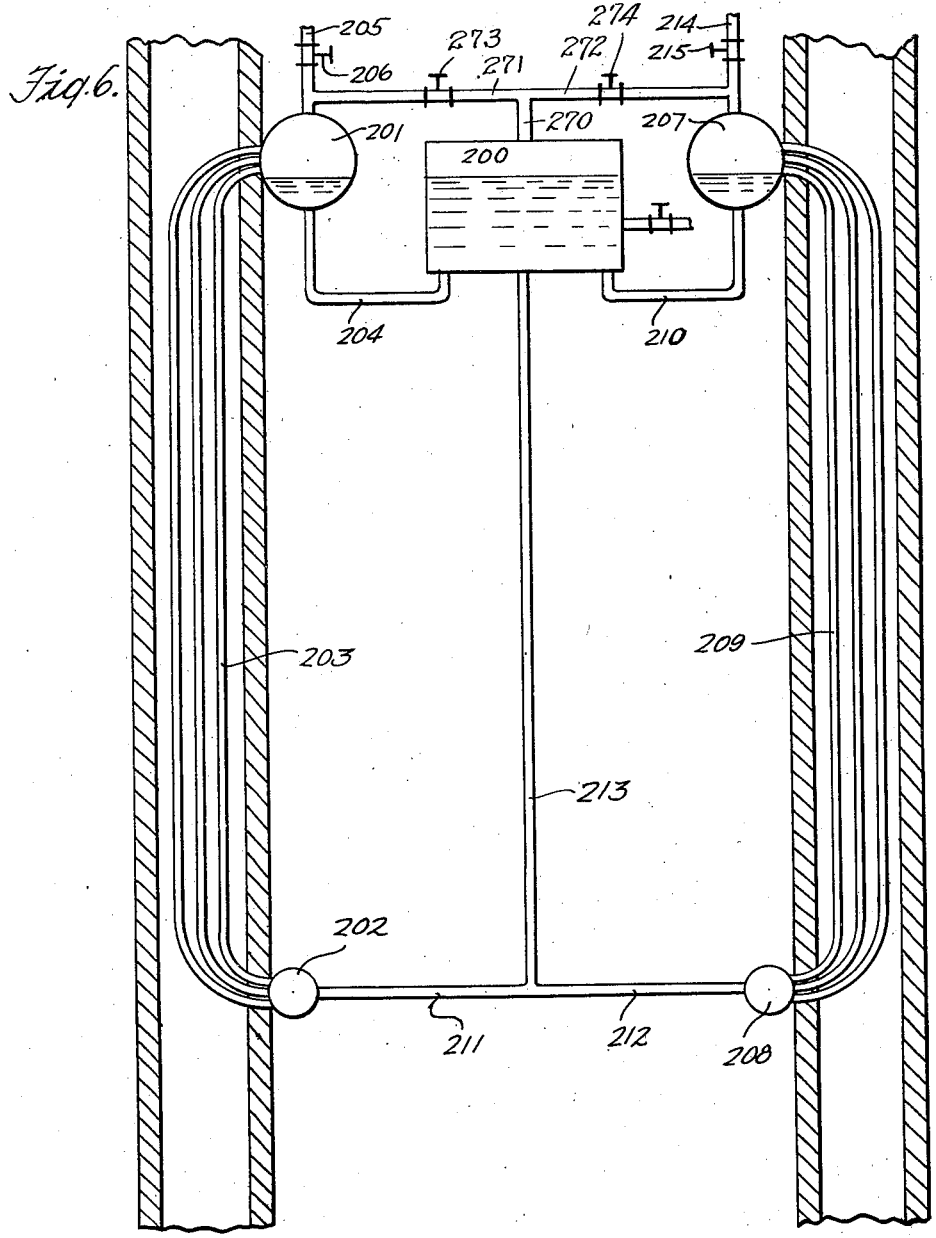
Figure 6 shows a combination of two geyser tube generators operated in parallel at the same pressure.

In Fig. 6, two separately fired geyser tube generators are shown operating in parallel at the same pressure. The arrangement is very similar to that shown in Fig. 5 except that both generators are of the geyser tube type. Thus, a common circulating tank 200 is provided and a single down-take pipe 213 communicates from this tank through the pipes 211 and 212 to the lower headers or drums 202 and 208 of the two geyser tube generators. These generators are also provided with upper steam drums 201 and 207 and geyser tubes 203 and 209, respectively. Pipes 204 and 210 conduct water from the water space of the drums 201 and 207 to the central tank 200. Steam is taken off from the drum 201 through the pipe 205 controlled by the valve 206 and in a similar manner, steam is taken off from the drum 207 through the pipe 214 controlled by the valve 215. The steam space of the tank 200 is connected to the steam lines 205 and 214 by the pipes 270, 271 and 272. Valves 273 and 274 are placed in the pipes 271 and 272 and permit shutting off the steam flow from one generator without affecting the steam pressure in the tank 200.

In operation, water from the tank 200 flows down through the pipe 213, the flow dividing and passing through the pipes 211 and 212 into the drums 202 and 208, whence the water circulates upwardly through the geyser tubes 203 and 209 into the drums 201 and 207 where steam is separated and the excess water flows back into the tank 200 through the pipes 204 and 210. Feed may be introduced into the tank 200 as shown or at any point in the pipe 213. The introduction of cold feed water into the tank 200 is desirable as the average density of the water column in the pipe 213 is thereby increased over that possible when feed is introduced into the pipe 213 at a lower point. The invention is, however, not limited to the introduction of feed water into the tank and where it is desired, this introduction may take place at any suitable point in the circulation.

The construction shown in Fig. 6 possesses many of the advantages of that shown in Fig. 5 such as flexibility under varying loads and large water reserve with relatively small water circulation. The construction is very suitable for the operation of a number of geyser tube generating units, particularly where the loads on the different units fluctuate. Separately fired geyser tube generating units are illustrated, but obviously a number of units in the same furnace may be operated in parallel in a similar manner and various combinations of parallel, series or series-parallel gas flows may be utilized wherever they are advantageous in view of the particular conditions of individual installations. The construction shown in Figure 5 may also be modified by placing the generating units in the same furnace and combinations of parallel, series or series-parallel gas flows may be used as described in connection with Figure 6.

Figure 7:
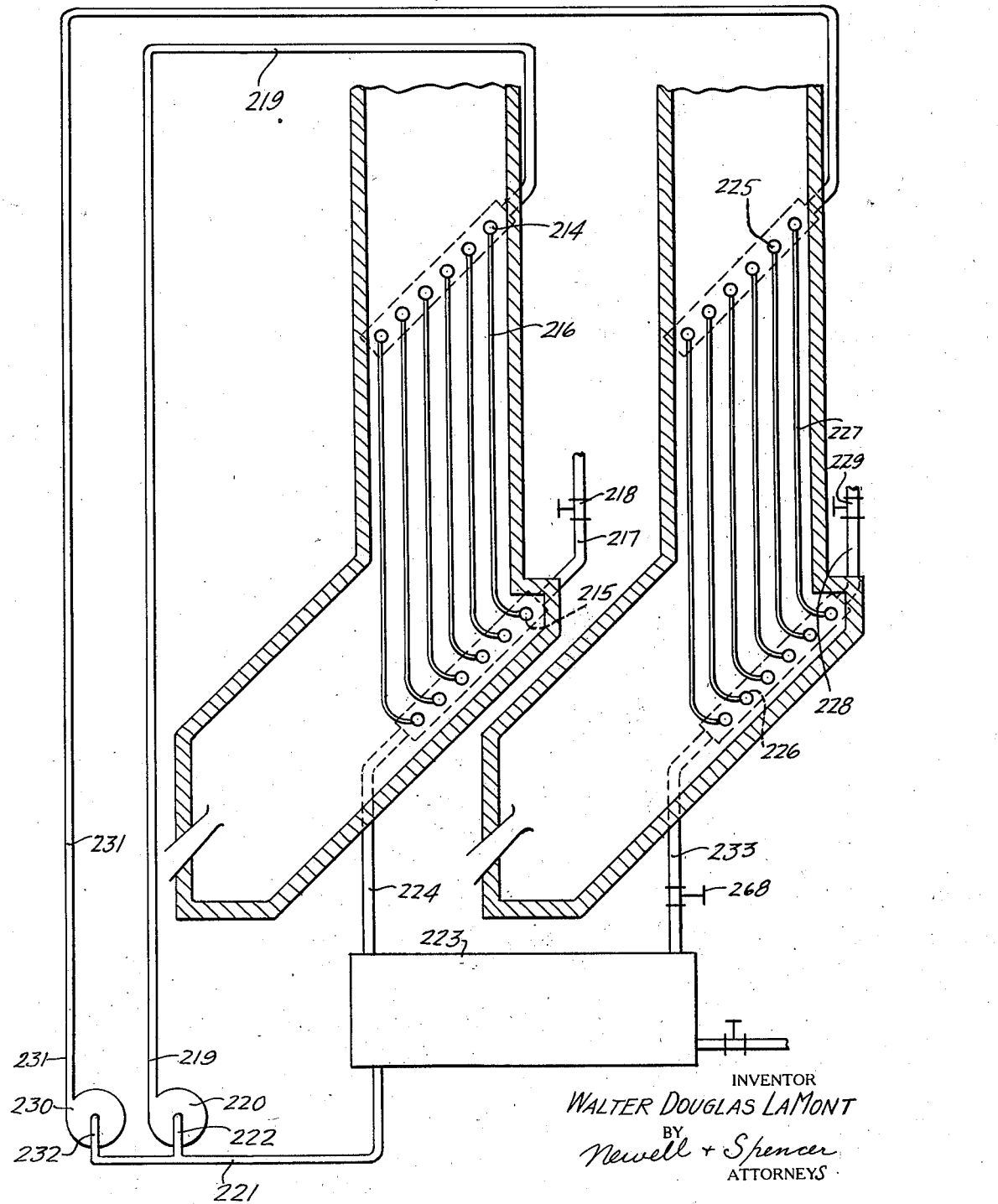
Figure 7 shows two film tube generators operated in parallel with individual circulating pumps.

Fig. 7 illustrates the operation of two La Mont film tube generators in parallel, the generators operating under different pressure. The generators consist in upper headers 214 and 225, lower headers or pots 215 and 226 and tubes 216 and 227. Steam from the low pressure generator is separated in the header 215 and passes out through the pipe 217 controlled by the valve 218. In a similar manner, high pressure steam is separated in the header 226 and passes out through the pipe 228, controlled by the valve 229.

Water is separated in the low pressure header 215, and flows down through the pipe 224 into the water reservoir 223. Water from the high pressure header 226 flows through the pipe 233 to the same reservoir through a suitable valve 268 which serves to reduce its pressure. From the reservoir 223, water flows through the pipe 221 and pipes 222 and 232 into the low pressure and high pressure pumps 220 and 230, respectively. These pumps force water through the pipes 219 and 231 into the upper headers 214 and 225. The difference in pressure can be effected by variations in the delivery pressure of the pumps or by a difference in size of the injection nozzles in the headers 214 and 225 or a combination of these two methods may be used. It should be understood in discussing film tube generators that the drawings illustrate these generators diagrammatically and that such structural features as injection orifices and the like are described in my prior Patent No. 1,545,668, (Case "A") an co-pending application Serial No. 32,064 filed May 22, 1925 (Case "B"). Feed water is introduced into the tank 223, as shown, but may be introduced at any other portion in the circulation.

The construction described above permits operation of a number of film tube generators at different pressures. The amount of water circulated through the different generators can be kept very small since the large volume of water in tank 223 provides for an effective reserve volume. Variations in steam demand in the different generators can be easily taken care of and there is no danger of a temporary water shortage. If the fluctuations are considerable, it may be desirable to introduce water level controls in the pipes 224 and 233, controlling respectively delivery of the pumps 220 and 230.

The tank 223 may be maintained at the pressure existing in the low pressure generator or a still lower pressure may be used by inserting a suitable valve or restriction in the pipe 224. When the tank is operated at a pressure lower than that of the lowest pressure generator, it is possible in some cases to omit a feed pump, the tank being kept at a pressure slightly below that of the feed supply line. The advantages of maintaining a low pressure in the tank have been described in connection with Figure 1 and are, of course, equally applicable to the construction of Fig. 7.

Separately fired generators are illustrated in Fig. 7, but it should be understood that the generating elements may be mounted in the same furnace with parallel or series gas flow. Various combinations are thus possible and in some cases are very desirable. Thus, for example, a high pressure unit in the hot zone of the furnace may be associated with a low pressure unit in the stack to effect a maximum reduction in the temperature of the heating gases and other combinations are also possible.

Figure 8:
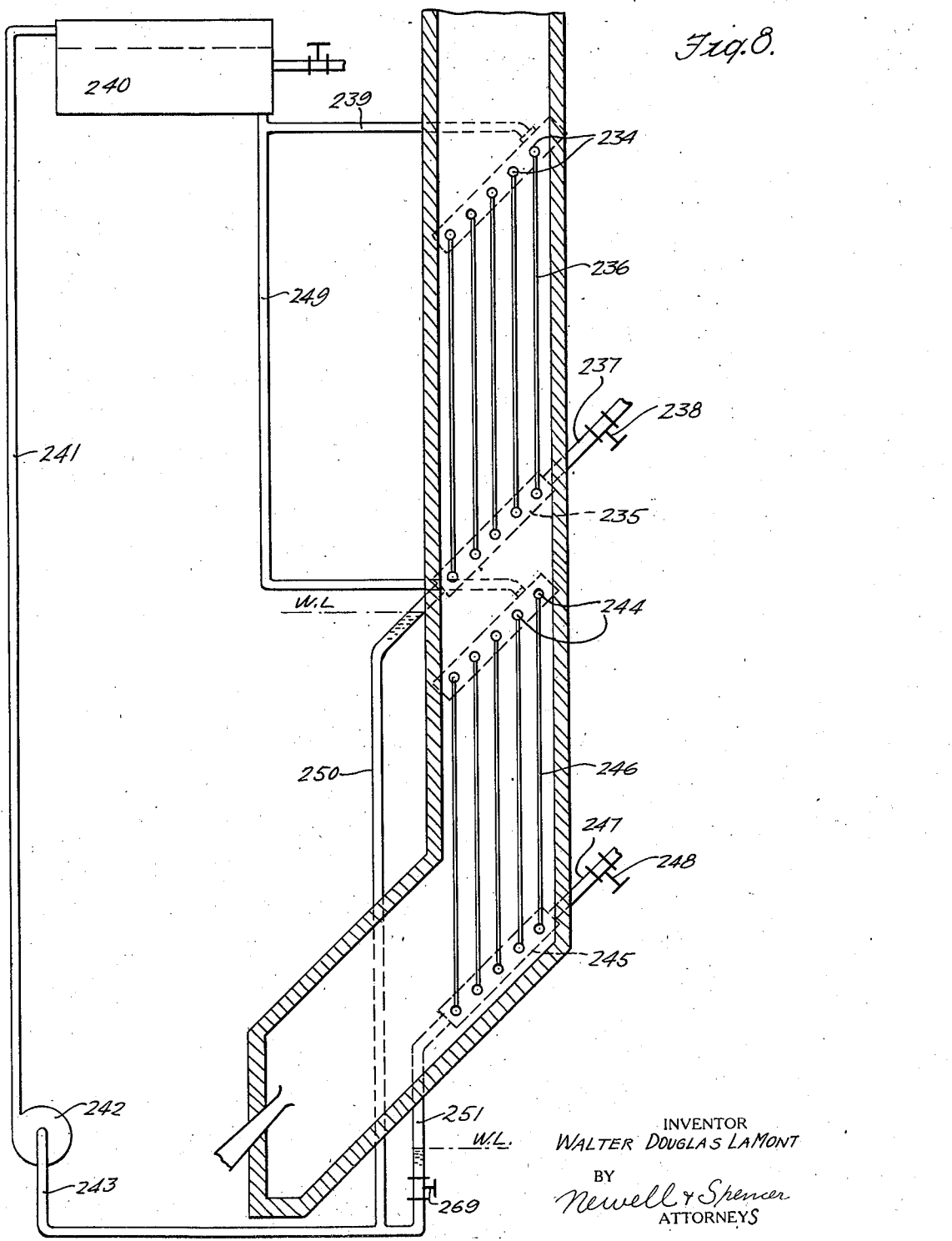
Figure 8 illustrates two film tube generators having a common hydraulic head and operating under different pressure.

In Fig. 8, two film tube generators are illustrated as operating in parallel under different pressures using a common circulating tank to provide hydraulic head. The high pressure generator which is in the lower portion of the furnace structure consists in upper headers 244, lower header 245 and generating tubes 246, and is provided with a steam pipe 247 controlled by a valve 248. Similarly, the low pressure generator in the stack consists in upper headers 234, lower header 235, generating tubes 236, steam pipe 237 and steam control valve 238. A tank 240 is placed at an elevation above the higher of the two upper headers and water is fed to these headers through the pipes 239 and 249. The difference in pressure in the two generators may be in part effected by the difference in hydraulic head from the tank 240 or a difference in orifice size in the headers 234 and 244 may be used or both methods may be combined.

Water separated in the low pressure header or pot 235 flows down through the pipe 250 into the pipe 243 and similarly, water separated in the high pressure lower header or pot 245 flows down through the pipe 251 into the pipe 243, a suitable reducing valve 269 being provided to bring the pressure down to that in the pipe 250. The pipe 243 leads into the suction of the pump 242 whence water is delivered through the pipe 241 into the tank 240. Feed may be introduced into the tank 240 or at any other suitable point in the circulating circuit.

The arrangement above illustrated provides for the operation of a number of film tube generating units at different pressures in a simple and effective manner without involving a plurality of pumps or other moving parts. A constant hydraulic head with a sufficient reserve volume of water is present at all times in the tank 240, and, accordingly, a very small amount of water may be normally circulated through the generators without endangering the tubes. The hydraulic head is constant at all times and a very even steam pressure and reliable operation is thereby assured.

A single pump suffices to bring about circulation and need not be of excessive size as minor fluctuations in demand are taken care of by the relatively large volume of water in the tank 240. The advantages of the large volume of water held in reserve in tank 240 are particularly marked in cases of widely fluctuating steam demands, and particularly demands which are subject to sudden fluctuations of short duration. In the ordinary design of film tube generators, it would be necessary to provide for a very large pump in order to take care of momentary large fluctuations. When, however, a tank is used as described above, the pump need only be sufficiently large to take care of the average steady peak demand and short period fluctuations are taken care of by the reserve volume of the water. The introduction of said water directly into the tank instead of into the pump circulation makes it possible to still further reduce the size of the pump, as it is only necessary for the pump to take care of the average steady demand, and even fairly long continued peak demands will be taken care of by additional feed.

The arrangement of high pressure generators in the hot zone and low pressure generators in the stack is very effective since the heating gases are progressively reduced in temperature and the final stack temperature can be brought to a very low figure.

Figure 9:
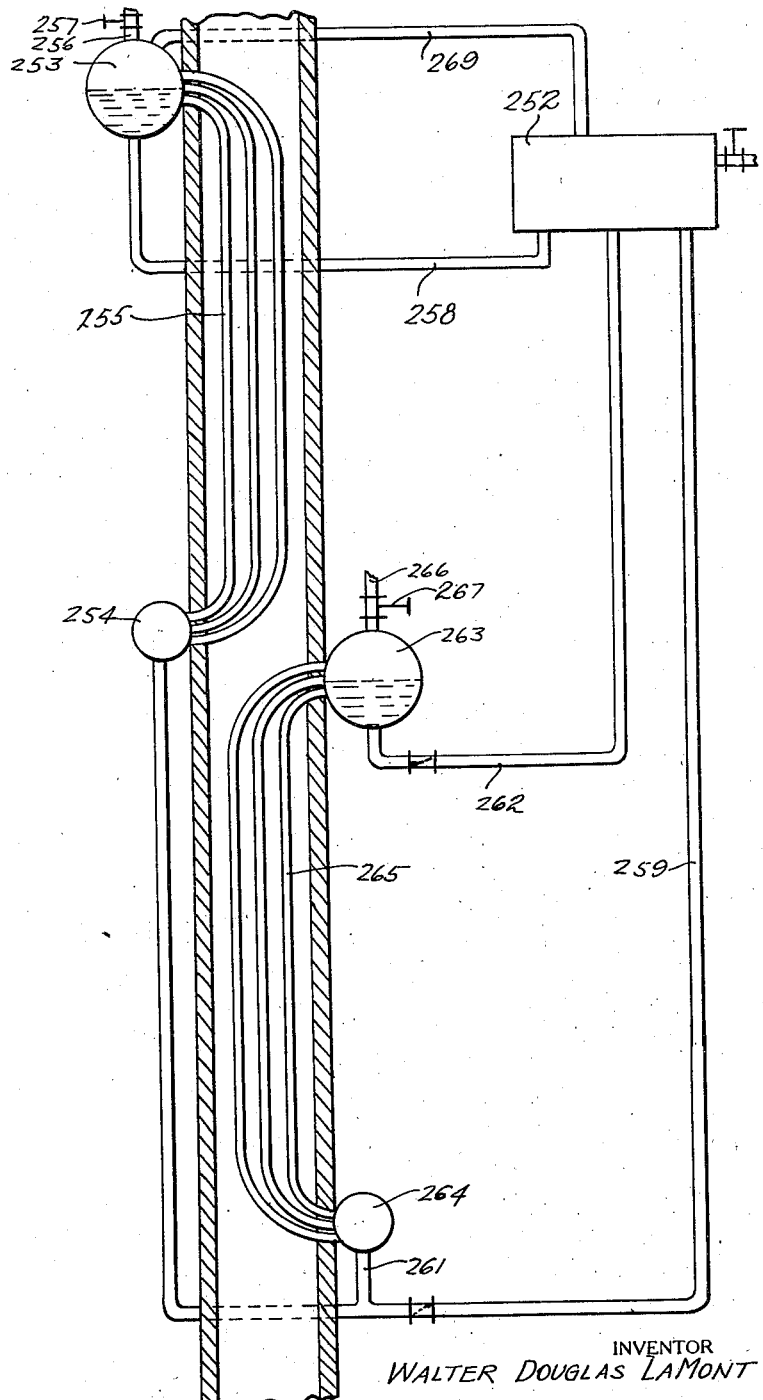
Figure 9 illustrates two geyser tube generators operated in parallel at different pressures.

Fig. 9 illustrates the combination of two geyser tube generators operating under different pressures and being heated in series by the same heating gases. The upper or low pressure geyser tube generator consists in an upper drum 253, lower header or drum 254 and geyser tubes 255. Steam is taken off from the drum 253 through the pipe 256 controlled by the valve 257. Similarly, the lower or high pressure generator consists in a drum 263, lower header 264 and geyser tubes 265, steam being taken off through the pipe 266, being controlled by the valve 267. A common supply tank is shown at 252 and is connected with the water space of the drum 253 by the pipe 258 and with the water space of the drum 263 by the pipe 262. The steam space of the tank 252 is connected to the steam space of the drum 253 by the pipe 269. The pipe 259 leads from the tank 252 to the lower header 254 of the low pressure generator and a branch pipe 261 connects the pipe 259 to the lower header 264 of the high pressure generator.

In operation, water from the tank 252 flows by gravity into the headers 254 and 264 and up into the geyser tubes 255 and 265. Obviously, the water in the tubes 265 will be under a considerably higher pressure than in the tubes 255 owing to the difference in hydraulic head. The circulation is the usual one in geyser tube generators, that is to say, the water in the lower portions of the generating tubes 255 and 265 becomes superheated and rises with violent ebullition, flowing into the upper drums 253 and 263 in spurts or pulses. Steam is separated in the drums 253 and 263, passing off through the pipes 256 and 266 and the water flows from the water space of the drums through the pipes 258 and 262 into the reservoir 252. The steam presure in the drum 263 is, of course, sufficiently high to prevent water flowing from the tank 252 back into it, although, if desired, an additional precaution can be taken by inserting a check valve in the pipe 262, as shown. Check valves can also be advantageously incorporated in the pipe 259 on either side of the entrance of the pipe 261. These valves are not essential to the operation of the generator, but are desirable where the generator operates under a high rating as they prevent any tendency toward backflow, particularly on starting.

Thermally, the arrangement above described is very efficient, since high pressure steam is generated in the tubes 265 which are situated in the hottest zone of the furnace and the partly cooled gases then strike the tubes 255 where steam at a lower pressure is generated and the gases are correspondingly cooled to a relatively low temperature. Circulation is continuous and rapid and considerable variations in steaming of the two generators can be taken care of as the tank 252 contains a considerable reserve volume of water, thus making it unnecessary to circulate an excessive amount of water through the generator circulations themselves. In fact, the present arrangement shares the advantages of parallel operation from a common water source which are inherent in the broader aspects of the present invention. In addition, a reliable and rapid circulation is assured without the use of pumps or other moving parts which is of advantage in many installations, particularly where supervision is intermittent.

Feed water is shown as introduced into the tank 252, but it may be introduced at any point in the down circulation through the pipes 258, tank 252 and pipe 259. In fact, for some installations, it may be desirable to introduce part or all of the feed water into the pipe 258 or into the water space of the drum 253 as a cooler column of water is thereby insured in pipe 258, resulting in a greater differential pressure in the tubes 255 and 265 owing to the larger difference in density in the water column of the external circulation and the heated water and steam in the generating tubes.

The steam is shown as taken off individually at different pressures, but it will be clear that the steam can be mixed where it is desirable, in which case, the high pressure steam from the drum 263 on expanding to the pressure of the steam in the drum 253 will usually result in superheating the steam or in drying out moisture. Of course, a suitable reducing valve must be provided in order to prevent the high pressure steam from flowing back into the drum 253.

In the foregoing figures, at least one of the generators has been either a film tube or a geyser tube generator which by its very nature requires a positive circulation. The advantages of running one or more generators in parallel with positive circulations or positively induced circulations are not confined to systems utilizing generators which normally have a positive circulation. On the contrary, it is possible to greatly increase the efficiency of conventional types of boilers by giving them a positive circulation or a circulation which is induced or assisted positively.

Figure 10:
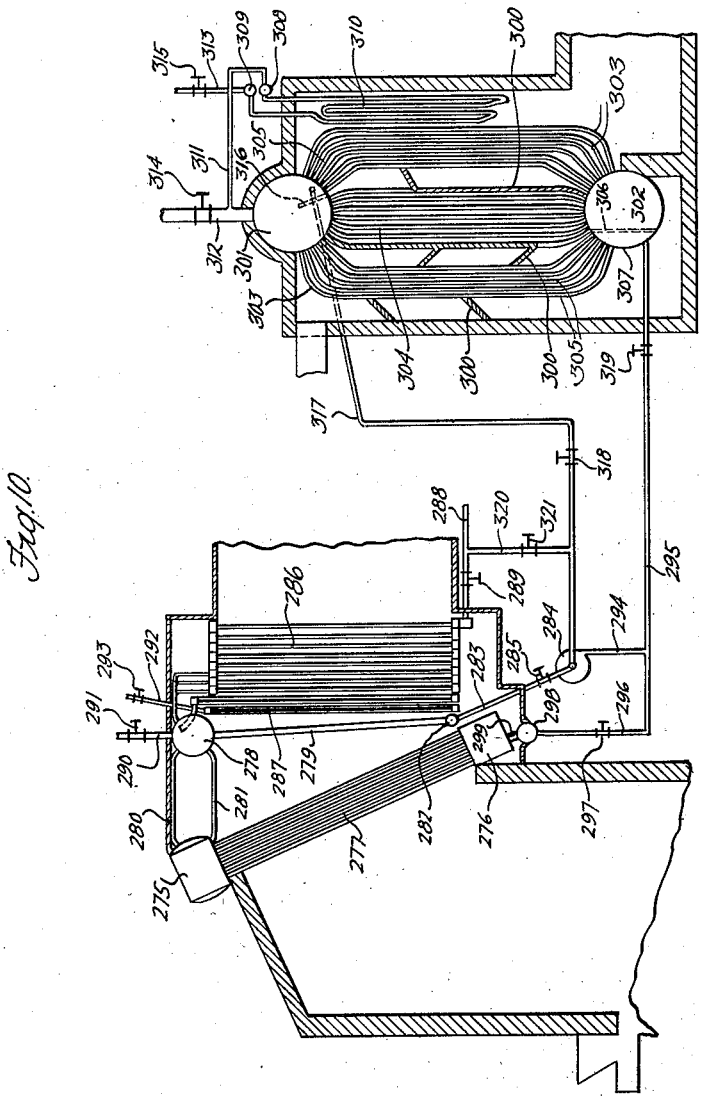
Figure 10 illustrates a modified coal fired Edgemoor boiler operated in parallel with a modified waste heat Ladd boiler.

Fig. 10 illustrates a modification in which two common types of water tube boilers are redesigned to permit positively induced circulation and connected to run in parallel.

The particular modification illustrated shows a coal-fired, Edgemoor, single-pass, water tube boiler and a Ladd water tube boiler which is heated by waste heat. Both boilers are redesigned to permit positively induced circulation and the positive circulation is arranged to operate in parallel.

The Edgemoor boiler consists in the usual upper and lower drums 275 and 276 connected by generating tubes 277 and associated with a rear steam drum 278 and drain tubes 279. The conventional steam and water circulating tubes 280 connecting the steam spaces of the drums 275 and 278 are preferably supplemented by additional circulating tubes 281, connecting the water spaces of these two drums. In some cases, however, tubes 281 may be omitted.

Instead of connecting the tubes 279 to the lower drums 276, as in standard practice, these tubes are united into a header 282, from which a pipe 283 leads to the circulating pump 284. A valve 285 is provided to control the flow.

The Edgemoor boiler is provided with the usual preheater 286 and superheater 287, feed water being introduced through the pipe 288 provided with the valve 289. Saturated steam may be taken off from the drum 278 through the pipe 290 provided with the valve 291, while superheated steam is furnished by the superheater to the superheated steam main 292 provided with the control valve 293.

The discharge of the pump passes through the pipe 294 into the pipe 295 from which a branch 296, provided with the valve 297, leads to a header 298 from which connecting pipes 299 pass into the lower drums 276.

A complete positive circulation through the generating tubes is thereby provided, water passing down from the drum 278 through the pipes 279 and header 282 into the pipe 283 which forms a suction of the pump 284. The water discharged then flows through the pipes 294 and 296 into the header 298 and thence through the pipes 299 into the drums 276 and up through the generating tubes 277 into the steam drums 275, whence steam and water are returned to the drum 278 through the pipes 280 and 281, thus completing the circuit. Feed water passes through the preheater 286 into the drum 278 in the usual manner.

A waste heat Ladd water tube boiler is shown at the right and consists of an upper drum 301, lower drum 302, and tube bundles 303, 304 and 305. The lower drum 302 is divided into two unequal chambers by the baffle 306, as is usual in the Ladd design. This baffle serves to form a small chamber 307 into which the tubes of the tube bundle 303 are led.

Suitable baffles 300 are provided to cause the waste heat gases to pass first over the tubes 305, then over the tubes 304 and finally over the tubes 303. The design of baffles is the usual one in the Ladd boiler. A superheater consisting of headers 308 and 309 connected by superheater tubes 310 is arranged in the usual position in the first pass of the boiler, saturated steam from the drum 301 entering the header 308 through the pipe 311, which joins the saturated steam pipe 312. Superheated steam passes from the header 309 into the superheated steam main 313. Valves 314 and 315 are provided to regulate the steam flows in the mains 312 and 313 respectively.

The conventional Ladd boiler is redesigned to effect positive circulation by placing the baffle 316 in the upper drum 301, dividing the lower part of the water space of the latter into two unequal compartments, into the smaller of which the tubes 305 enter. A pipe 317 leads from the lower portion of this smaller compartment into the suction of the pump 284 and is provided with a suitable valve 318. The pipe 295 carrying water from the discharge of the pump enters the compartment 307 of the drum 302 and is provided with a suitable control valve 319.

In operation, water is forced by the pump through the pipes 294 and 295 into the compartment 307 of the drum 302 whence the water flows upwardly through the tubes 303 into the upper drum 301 and is thence deflected downwardly by the baffle 316, flowing for the most part through the tubes 304 into the larger compartment of the drum 302. Thence, the water together with any steam generated in the tubes 304 passes upwardly through the tubes 305 which are situated in the first pass of the boiler and discharges the mixture of steam and water into the drum 301. The baffle 316 causes a large proportion of the unevaporated water to flow through the pipe 317 back into the suction of the pump, thereby producing a positive circulation. The circulation is not completely positive as the baffle 316 does not extend to the full height of the water space of the drum 301 and a certain amount of unevaporated water from the tubes 315 flows over the baffle 316 and down through the tubes 304 in the usual convection circulation of the Ladd boiler. The total circulation is, therefore, positively assisted and is not a complete positive circulation.

Feed water for both boilers may advantageously be introduced through the pipe 288 into the preheater 286 of the Edgemoor boiler where it is heated and delivered through the drum 278 and tubes 279 into the header 282 and thence through the pipe 283 into the suction of the pump. As all the feed water for both boilers passes through the preheater 286, the latter is enabled to abstract a large amount of heat from the gases passing through the preheater and it is, therefore, possible to operate the Edgemoor boiler at extremely high ratings without resulting in undue losses due to excessive stack temperatures.

Where it is desired, however, feed water also may be introduced directly into the pipe 317 through the branch pipe 320 controlled by the valve 321.

The single pump serves to produce a very rapid positive circulation through the Edgemoor boiler and very greatly assists the circulation in the Ladd boiler. The steaming capacity of both units are materially enhanced and even when the ratings are pushed very high, there is no danger of steam locking of the tubes as sufficient positive circulation is provided at all times to sweep steam bubbles from the walls of the tubes. Wide fluctuations in steam demand and heating can be effectively taken care of and the combination is particularly effective for installations where the waste heat source used for generating steam in the Ladd boiler is intermittent or fluctuating in nature. Great flexibility of operation is assured by the modification above described and wide variations in steaming capacity of the different units are possible. By suitable arrangement of the valves 285, 297, 318 and 319, the amounts of water flowing through the different generators can be accurately adjusted in accordance with the varying steam demands of the different units. Either unit may be cut out and the remaining unit operated alone. Feed can be introduced wholly through the Edgemoor preheater or wholly into the pump suction or part of the feed water may be introduced into the preheater and part into the pump suction as may best suit the particular operating conditions.

The Edgemoor and Ladd boilers are well suited to modifications whereby positive circulation or positively assisted circulation is brought about. Other types of common type boilers may, however, be utilized with suitable structural variations to effect the desired circulation. These two types are used for illustration only and do not limit the scope of the invention.

Figure 11:
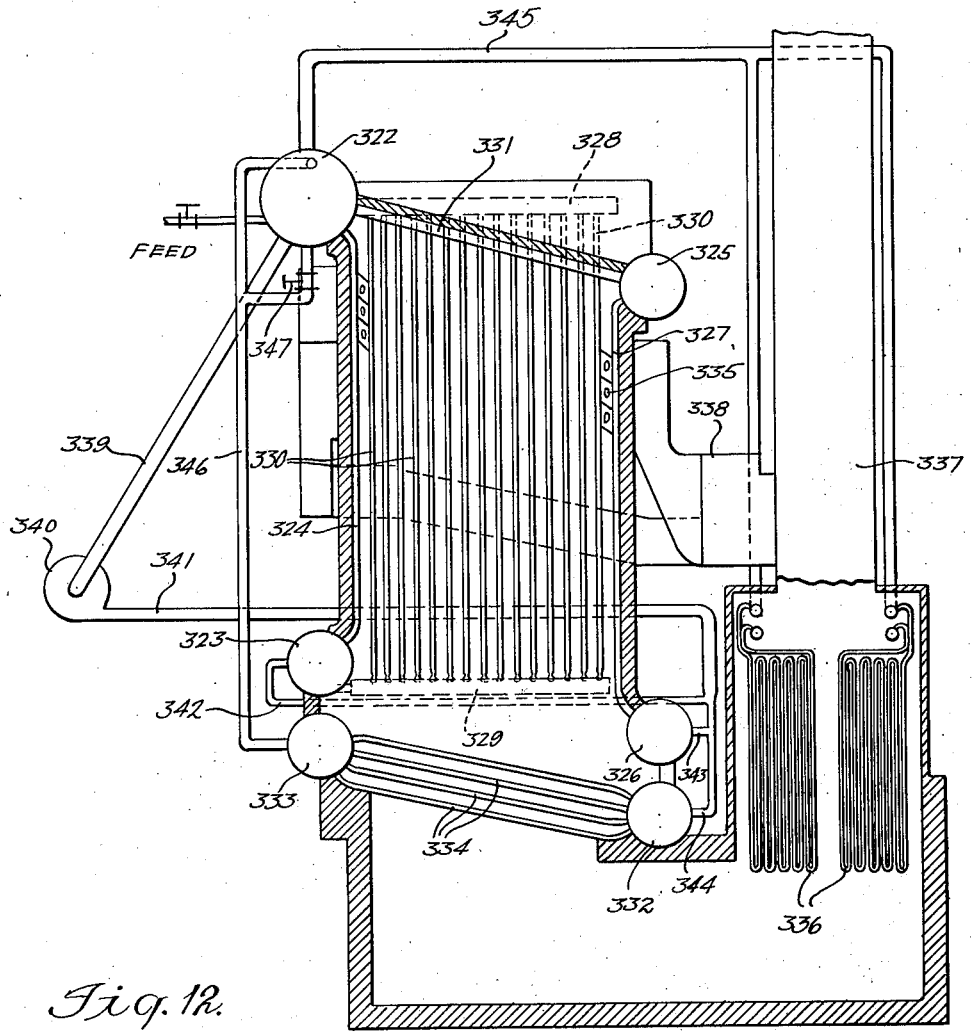
Figure 11 illustrates a water wall and water tube convection heated generator operated in parallel.
Figure 12:
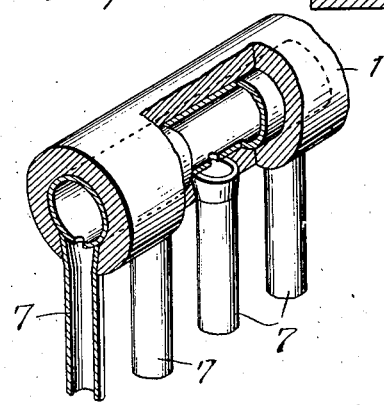
Figure 12 is a perspective view showing a portion of a header with the jet orifices leading therefrom into the generator tubes of Figure 1.

In the foregoing figures, only combinations of convection heated generators have been shown. The advantages of the present invention are, however, equally applicable to water wall generators and a combination of water wall generators operated in parallel with convection heated generators is shown in Fig. 11 which illustrates a modified water wall generator and convection heated generator similar to the well known Combustion Engineering Co.'s water wall boiler.

A rectangular furnace is completely surrounded on all four sides with water walls. Three of these water walls are shown in Fig. 11 and consist in a main steam and water drum 322 connected to a lower drum 323 by the water wall tubes 324, corresponding upper and lower drums 325 and 326 on the opposite side of the furnace joined by water wall tubes 327 and an upper header 328 and lower header 329 connected by tubes 330. The fourth side of the furnace, not shown, is provided with a water wall consisting in upper and lower headers and steam generating tubes similar in design to that shown at 328, 329, and 330. The upper header 328 and the corresponding header on the opposite side, not shown, connect directly into the drum 322 and the drum 325 is also connected to the drum 322 by circulating pipe 331. The lower header 329 is connected to the lower drum 323 and the corresponding lower header of the opposite water wall, not shown, is also connected to the other end of the same drum.

The convection type generator consists in a lower drum 332, an upper drum 333 connected by generating tubes 334. The circulating tube 346 extends from the drum 333 to the drum 322, branching as it approaches the latter drum, one branch connecting to the steam space and the other to the water space. The branch connecting to the water space is controlled by a valve 347.

Fuel such as powdered coal, is blown in through the openings 335 situated near the corners of the furnace. Most of the radiant heat is absorbed by the water walls and the hot gases pass downwardly over the convection type generator and then upwardly over the superheater tubes 336 and air preheater 337 up into the stack, not shown. Hot air from the air preheaters is blown by the blower 338 through the orifices 335, suitably mixing with oil or powdered coal.

Water circulation is downwardly from the water space of the drum 322 through the pipe 339 into the pump 340 whence the water is discharged through the pipe 341 into the branch pipes 342, 343 and 344, which connect to the drums 323, 326 and 332 respectively. The circulating tube 346 leads from the upper drum 333 of the convection heated generator into the steam space of the drum 322. When the valve 347 is opened, a common water level for all the water walls and the convection generator is established in the drum 322. When, however, the valve 347 is closed, it is possible to establish a separate water level in the drum 333 where this may be desirable. In operation, therefore, the water flows from the drum 322 into the lower drums of the four water walls and the convection heated generator, up through the generating elements of these units and back into the drum 322, thus completing the circuit.

The generating tubes entering the lower header 329 and the corresponding header on the opposite water wall, not shown, are preferably provided with orifices or restrictions so that the water tends to flow evenly through all of the tubes. If the generating tubes were unrestricted there would be some danger of diverting a disproportionate amount of water through the tubes nearest the drum 323 and starving the tubes at the rear of the header. The restrictions which create a pressure differential between the header 329 and the generating tubes tend to equalize the flow of water even when all the orifices are of the same size. The provision of orifices in some cases may be dispensed with. Where, however, the generator is run at high ratings, it is usually desirable to assure an even circulation throughout the tubes by this means.

Steam is separated in the drum 322, passes through the pipe 345 into the superheater 336 and thence out into a superheated steam main, not shown.

The circulation through all of the units is positive and rapid and a very high steaming capacity is assured, especially in the water walls which are exposed to the full radiant heat of the fire. A very rapid circulation is possible and there is no danger of burning out tubes even when the boiler is forced to very high ratings.

Feed is shown as introduced into the drum 322 but may be introduced at any other point. In some cases there is advantage in introducing feed into the drum 332 as by this means, the water temperature in the lower portions of the tubes 334 is very materially reduced which aids in lowering the temperature of the gases passing through the generator and results in a corresponding increase in thermal efficiency. Feed may, of course, also be introduced in a plurality of locations where such a procedure may be desired.

The modification shown in Fig. 11 is illustrated as a combination of a water wall generator and convection heated generator operated in parallel, but the invention is not limited to water walls or generators of this particular type and many other types of water walls and generators may be modified to operate in parallel with positive circulation. The circulation in the water walls and convection heated generator shown in Fig. 11 is completely positive, but it is, of course, not necessary to have a completely positive circulation in both units and in one or more of the units, a positively assisted circulation may be used and in some cases is desirable.

Fig. 13 shows an arrangement of the generators similar to that shown in Fig. 3 but with one of the generators at a lower level than the others. This arrangement makes possible the operation of the generators at different pressures by utilizing the difference in hydraulic head of water supplied to the generators at the different levels as described in connection with Figs. 8 and 9. Similarly to the arrangement shown in Fig. 8 connections may be provided from the lower headers 114, 115 and 116 for taking off the steam generated from the different generators when these generators are operating at different steam pressures.

In the claims, the expression "positively induced circulation" is used as a generic term to cover circulations which are fully positive, that is to say, in which all of the water passing through the generating tubes is positively circulated, as for example, in a film tube generator, or geyser tube generator or in certain modifications of common water tube generators, such as an Edgemoor single pass boiler, shown in Fig. 10. The expression also includes circulations in which some of the water is circulated by convection and some is circulated positively, that is to say, circulations in which there is positive assistance. Examples of such circulations are shown in the Ladd boiler in Fig. 10 and in the inclined tube water tube boiler of Fig. 4.

The expression "positive circulation" includes not only mechanically effected circulations as by pumps and the like, but also circulations which are brought about by positive thermal action as in geyser tube generators.

Having thus described the invention, what is desired to be secured by Letters Patent of the United States and claimed is:

1. The method of generating steam in a plurality of individual steam generators each having heat transferring tubes which comprises delivering the water to be vaporized from a common source separate from the generators in parallel to the generators, causing the water to flow unidirectionally with the steam generated through the tubes of at least two generators, and returning to said common source at least part of any unevaporated water from the generators.

2. The method of generating steam in a plurality of generators at least two of which are arranged for positive circulation of water therethrough together with the steam generated, which comprises causing the water to be vaporized to be delivered to the generators from a common source and to circulate in parallel through the generators, discharging from the generators any unevaporated water and returning at least a part of the unevaporated water to said common source.

3. The method of generating steam in a plurality of positive circulation generators, at least one of which is a generator into the steam generating elements of which water is introduced in quantity less than sufficient to fill the elements but greater than the steam generating capacity thereof, which comprises delivering the water to be vaporized from a common source in parallel to at least two of the generators, causing water to flow through the generators and to be discharged therefrom together with the steam generated, and returning to said common source at least part of the water unevaporated in the elements.

4. The method of generating vapors in a plurality of positively induced circulation generators which comprises circulating the liquid to be vaporized from a common source in parallel through the generating elements of at least two generators at different pressures, and returning at least part of the unevaporated liquid to said common source.

5. The method of generating vapors in a plurality of positively induced circulation generators, at least one of which is a mechanically circulated generator, which comprises circulating the liquid to be vaporized from a common source in parallel through the generating elements of at least two generators at different pressures, and returning at least part of the unevaporated liquid to said common source.

6. The method of generating vapors in a plurality of positively induced circulation generators, at least one of which is a mechanically circulated film tube generator, which comprises circulating the liquid to be vaporized from a common source in parallel through the generating elements of at least two generators at different pressures, and returning at least part of the unevaporated liquid to said common source.

7. The method of generating steam in a plurality of individual positive circulation generators which comprises circulating water in excess of that to be vaporized from a common source in parallel through the generating elements of at least two generators, discharging said excess from the elements with the steam generated, and returning all unevaporated liquid to said common source.

8. The method of generating vapors in a plurality of generators of the type in which the vapor is generated in a space into which the liquid to be subjected to vapor generating heat is delivered in quantity less than sufficient to fill the space but greater than can be evaporated while it is subjected to said heat, which comprises circulating the liquid to be vaporized in parallel through the generators from a common source which is at a pressure below the pressure existing in the generators, separating the steam generated from the unevaporated liquid, and returning unevaporated liquid to said common source, the pressure of the liquid being reduced in said return flow from that existing in the generators to the pressure existing in the common source.

9. An apparatus for the generation of steam comprising in combination a plurality of positive circulation steam generators, at least two of which have each a set of steam generating elements, means associated with one end of each element to distribute the water thereto and cause the water together with the steam generated to travel therethrough to the opposite end thereof, an elevated reservoir, means for circulating water from said reservoir in parallel through the generating elements of at least the two generators under the pressure head of the water in the reservoir, and means for returning unevaporated water from the generators to said reservoir.

10. An apparatus for the generation of steam comprising in combination a plurality of steam generators, an elevated reservoir separate from the generators, means for circulating water from the elevated reservoir in parallel through the generators, means for operating at least two of the generators at different pressures, and means for returning unevaporated water from the generators to the reservoir.

11. Apparatus for the generation of steam comprising in combination a plurality of steam generators situated at different levels, an elevated reservoir, means for maintaining a positive circulation of water from the reservoir in parallel through the generators, means for operating at least two of the generators at different pressures, the difference in pressure being effected in part at least by the difference in hydraulic head between the reservoir and the generating elements of the respective generators, and means for returning unevaporated water from the generators to the reservoir.

12. Apparatus for the generation of steam comprising in combination a plurality of steam generators, an elevated reservoir, means for circulating water from said reservoir in parallel through the generators, means for operating at least two of the geerators at different pressures, said difference in pressure being effected in part at least by circulating the water to at least one of the generators through a pressure transformer.

13. Apparatus according to claim 10, in which at least one of the generators is a film tube generator.

14. Apparatus according to claim 11, in which at least one of the generators is a film tube generator.

15. Apparatus according to claim 12, in which at least one of the generators is a film tube generator.

16. Apparatus for the generation of steam comprising in combination, a plurality of steam generators, a reservoir below the level of the generating elements of the generators, means for positively circulating water from said reservoir through the generators, means for operating at least two of the generators at different pressures, and means for returning to the reservoir unevaporated water discharged from the generators.

17. Apparatus according to claim 16, in which a single mechanically operated pump is associated with means to supply water to the generating elements at different pressures, said water being caused to flow through pressure transformers before entering the generating elements.

18. The method of generating steam in generators of the type in which water while it is subjected to steam generating heat is caused positively to flow in a continuous stream in quantity greater than can be evaporated, which comprises causing the water to flow in parallel through the generators from a common source which is at a pressure below the pressure existing in the generators, and returning the unevaporated water to said common source, the pressure of the water being reduced in said return from that existing in the generators to the pressure existing in the common source.

19. The method of generating steam in a plurality of individual steam generating unit which comprises collecting water in a common storage space, delivering water therefrom in parallel to the steam generating units, positively distributing the water in at least two of the steam generating units into heat exchanging relation with the source of heat in said unit so as to cause the water to flow continuously in said distributed relation during the continuance of said heat exchange, and discharging with the steam generated any water unevaporated during continuance of heat exchange.

20. The method of generating steam in a plurality of separately operated sets of steam generating elements which comprises collecting water in a common storage space, positively delivering therefrom in a parallel to the sets of steam generating elements water in excess of the steam to be generated, distributing the water to each set in relation to the steam generating conditions therein, causing the water to flow through each set unidirectionally with the steam generated therein, collecting the excess water discharged from the elements, and returning it to the common storage space.

21. Apparatus for the generation of steam comprising a plurality of individual steam generators of the type having a positive circulation of water in the same direction as the steam flow therein, a reservoir for storage of water and common to the generators, connections from the reservoir through which the water may be delivered to the generators in parallel, connections for collecting water discharged from the generators so as to return it to the reservoir, and means for causing the water to flow through the circuits thereby formed in the direction of the positive circulation in the generators.

22. Apparatus for the generation of steam comprising a plurality of individual steam generators of the type in which water is received at one end of heat transferring surfaces from the other end of which steam is discharged, a reservoir for storage of water, a pump connected so as to cause water to flow from the reservoir to the water receiving ends of the generators, means for controlling the flow of water to the several generators to suit the conditions of steam generation therein, means for separating the steam generated from any unevaporated water discharged therewith, and means for returning said unevaporated water to the reservoir.

23. Apparatus for the generation of steam comprising a plurality of individual steam generators, each having tubes connected to water inlet headers and connected at their opposite ends to discharge headers, a reservoir for storage of water, a conduit leading from said reservoir to which said water inlet headers are connected in parallel, a pump in said conduit to deliver water from the reservoir to the water inlet headers in quantity in excess of the evaporation in the tubes, means associated with the discharge headers for separating from the excess water the steam discharged therefrom, and a conduit connected to said steam separating means and to the reservoir for return thereto of the excess water.

24. Apparatus for the generation of steam comprising a plurality of separate steam generators each having a set of tubes, a reservoir for storage of water, a conduit leading from said reservoir to which the generators are connected in parallel, means for positively delivering water through said conduit from said reservoir to the generators, means associated with the generator for positively distributing water to and causing it together with the steam generated to flow in one direction only in the tubes, and means for collecting any unevaporated water discharged from the tubes and returning it to the reservoir.

Signed at New York, New York, this 16th day of July, 1926.

WALTER DOUGLAS LA MONT.